US010469651B2

(12) United States Patent
Cohen et al.

(10) Patent No.: US 10,469,651 B2
(45) Date of Patent: Nov. 5, 2019

(54) MULTI PROFILE CLOUD PLATFORM OF HIDDEN SYSTEM

(71) Applicant: iAvatar Ltd, Petach Tikva (IL)

(72) Inventors: Elia Cohen, Petach Tikva (IL); Eran Presenti, Tel Aviv (IL)

(73) Assignee: iAvatar Ltd, Petach Tikva (IL)

( * ) Notice: Subject to any disclaimer, the term of this patent is extended or adjusted under 35 U.S.C. 154(b) by 0 days.

(21) Appl. No.: 15/741,509

(22) PCT Filed: Jul. 6, 2016

(86) PCT No.: PCT/IL2016/050721
§ 371 (c)(1),
(2) Date: Jan. 3, 2018

(87) PCT Pub. No.: WO2017/006320
PCT Pub. Date: Jan. 12, 2017

(65) Prior Publication Data
US 2019/0306300 A1    Oct. 3, 2019

Related U.S. Application Data

(60) Provisional application No. 62/323,709, filed on Apr. 17, 2016, provisional application No. 62/188,740, filed on Jul. 6, 2015.

(51) Int. Cl.
| | |
|---|---|
| *H04M 1/00* | (2006.01) |
| *H04M 1/725* | (2006.01) |
| *H04L 29/06* | (2006.01) |
| *G06F 21/62* | (2013.01) |

(52) U.S. Cl.
CPC ...... *H04M 1/72563* (2013.01); *G06F 21/629* (2013.01); *H04L 63/102* (2013.01)

(58) Field of Classification Search
CPC ............................ G06F 21/31; H04L 67/306
USPC ........... 455/411; 348/841; 345/211; 380/247; 726/7; 713/189
See application file for complete search history.

(56) References Cited

U.S. PATENT DOCUMENTS

2012/0300927 A1* 11/2012 Choi ................... H04W 12/06
380/247
2014/0344334 A1* 11/2014 Trachtenberg ..... H04N 21/4307
709/203

* cited by examiner

*Primary Examiner* — Kiet M Doan
(74) *Attorney, Agent, or Firm* — Clements Bernard Walker PLLC; Christopher L. Bernard

(57) ABSTRACT

The present invention relates to a virtual operating system for operating a terminal protected privacy application to a cloud based service for any apparatus capable of internet interception. Operating in a hidden background and turning any mobile phone into a smartphone by operating cloud applications from anywhere. More specifically, the present invention is a terminal platform operating in a cloud service, as a background hidden service, connecting terminal to cloud profile (Avatar) in a cloud server environment erasing dialed cryptic code from device log. The system enables user to use multi profiles from within the cloud application by code and switch between them by using the multi profiles button (MPB).

11 Claims, 8 Drawing Sheets

MULTI PROFILE CLOUD PLATFORM OF HIDDEN SYSTEM

CROSS-REFERENCE TO RELATED APPLICATIONS

The present application is claiming priority to US provisional patent application "Hidden Application System For Smartphone", No. 62/188,740 dated Jul. 6, 2015 & to "Multi Profile Cloud Platform System" No. 62/323,709 dated Apr. 17, 2016. The contents of each of these applications are incorporated herein.

FIELD OF THE INVENTION

The present invention relates to a virtual operating system for operating a terminal protected privacy application to a cloud based service for any apparatus capable of internet interception operating in a hidden background. The system turns any mobile phone into a smartphone by operating cloud applications from anywhere. More specifically, the present invention is a terminal platform operating in a cloud service, as a background hidden service, that by dialing a predefined code-number it triggers a terminal application to upload, making sure that the dialed number is not recorded on device's dial log, enabling the user to upload multi profiles from within the cloud application (MPD) by code and switch between them by using the multi profiles button (MPB), comprising: an activation code comprising a cryptic code opening a terminal on apparatus without appearing on apparatus screen or leaving digital traces on apparatus, a security authentication device, shared only between users and the security authentication device connecting terminal to cloud profile (Avatar) in a cloud server environment erasing dialed cryptic code from device log, The virtual operating system comprising: an activation code comprising a cryptic code opening a terminal on apparatus without appearing on apparatus screen or leaving digital traces on apparatus, a security authentication device, shared only between users and the security authentication device connecting terminal to cloud profile (Avatar) in a cloud server environment erasing dialed cryptic code from device log, More specifically, the present invention is a terminal platform operating in a cloud service, as a background hidden service, that by dialing a predefined code-number it triggers a terminal application to upload, making sure that the dialed number is not recorded on device's dial log, enabling the user to upload multi profiles from within the cloud application by code using MPD and switch between them using the multi profiles button (MPB).

The applications are cloud based and reachable through any phone with internet connection. The system turns any mobile phone into a terminal platform operating like a smartphone. Dialing a predefined code-number triggers a cloud terminal platform to upload. The dialed code is not recorded on the communication device dial log therefore no one can access user's applications. The communication devise is a regular non sophisticated apparatus having internet connection. When a certain code is dialed, user gains access to the requested profile to which the code is associated in a cloud-server and communication opens. All operations are performed on cloud-server without leaving trace on communication device dial log. User has the option to use different profiles and he may choose any of them in each session and log between profiles.

BACKGROUND OF THE INVENTION AND PRIOR ART

The need for privacy and secrecy includes the ability to communicate with others without revealing user's identity or his private phone number, or location, avoiding being surprised while conducting a phone conversation, without the need to shut down the apparatus, or use its other communication abilities indicating that user is unavailable or uninterested to accept the call, etc.

The use of a smartphone has entered into our lives not only for telephone communication with one another by voice, but also to perform many other functions, like, sending electronic messages (text messages and electronic mail), paying for various services and the like. Therefore the prices and the competition between the manufacturers have risen accordingly. One of the aims of this system is to turns any communication apparatus into a terminal platform operating like a smartphone. Dialing a predefined code-number triggers a cloud terminal platform to upload all the features of a smartphone without having to own one. If the phone is lost, any non-sophisticated apparatus capable of using high quality internet service may be turned into a smartphone, when using the system.

Everyone knows that all the functions performed are easily traced, even when erased. Furthermore, there is no way one can keep his privacy from praying eyes, when using his smartphone or when losing it (theft, confiscation etc.). Many methods are available to protect the smartphone from use, when stolen, but very few are aimed to protect user's privacy, while using it.

There are some inventions, which deal with user's privacy, like for example; KR20140012828 (A) to CHO SUNG JAE published 4 Feb. 2014 for operation method of privacy protection and relief application for smartphone user. Said invention enables hiding a secret mode from other people when the smartphone user downloads and executes the privacy protection application, being converted into the secret mode, which automatically hides application icons from a smartphone screen to hide the use of the applications, from a normal mode when the user inputs a predetermined password using keypads and presses a send button to store and manage such as texts, call lists, phone number lists, picture and videos by providing additional secret storing space provided by the privacy protection application, and then being converted into normal mode. This invention offers protection by hiding application icons, but it still leaves traces on smartphone log, and is re-constructible.

Galaxy S3's secret service menu or other similar services are focused on hiding icons or items. But again, all functions performed on the smartphone through the hidden icon or applications are traceable.

CN103235903(A) to Huang Xiaohu, published 07-Aug.-2013 disclosed a processing method and device for hiding programs of mobile terminal. The processing method includes, setting a hidden program list into which the hidden programs are put, enabling user to simultaneously perform permission settings and access the hidden programs by encrypting or decrypting the hidden program list. The non-hidden program icons and the hidden program icons are displayed in a parallel mode in a display area of a display screen so that user may move a target program icon between windows in order to hide the target program icon or cancel the hiding of the target program icon. The moving between windows of hidden and non-hidden programs is performed by the use of an identity authentication password. When the window containing the non-hidden program icons is displayed and the input identity authentication password is wrong, the window of hidden programs remains hidden and effectively protected. This invention enables user to hide icons, but the hidden icons and its content are easily reconstructed from smartphone log, so the situation of "hidden icons" is temporary and easily reconstructed.

These difficulties and others are overcome by the present invention. The examples mentioned in this section are not exhaustive of the problems overcome by the present invention and there may be additional benefits and uses for the invention that will be apparent in light of the following description of the invention.

SUMMARY OF THE INVENTION

What makes this invention so unique is, among others, the combination of turning any type of communication device, immaterial of its quality or manufacturer, into a smartphone with hidden application and endless storage space.

What makes this invention so unique is, among others, the ability to operate in hidden method. Meaning that, when a certain code is dialed, all operations are performed on cloud-server without leaving trace on mobile dial log. User has the option to use different profiles and may choose any of them in each session and log between profiles.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

Unless otherwise defined, all technical and scientific terms used herein have the same meaning as commonly understood by one of ordinary skill in the art to which the present invention belongs. The methods and examples provided herein are illustrative only and not intended to be limiting. The present invention can be implemented in the testing or practice with methods and materials equivalent or similar to those described herein.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only.

In one embodiment, the application operates outside of a mobile phone and while the user is not connected (off line from the application) he cannot be reached by phone, SMS, or any other way. If a message was sent to a user while he is off-line, he will be able to see it when he logs in again, providing that the sender has not canceled the message.

In another embodiment, if predefined otherwise in a profile, while the user is not connected (off line from the application) he may be reached by phone, SMS, or any other way.

The new application enables user to build and amend his contacts, (people who are registered as members in the specific profile), and specific definitions, which are suitable for each specific profile thus creating several identities/usernames on one phone, each has its separate code number, list of contacts (or contact codes) and definitions avoiding the need to have several phones or phone numbers.

The present invention discloses a system to perform vocal phone communication, send all kind of electronic media under different profiles (Avatar—identities) simultaneously. Each profile has its own code; all profiles are on cloud-server. When user likes to connect with contact X via profile 1, contact X has to have the application installed on his phone and be accepted by user as a registered member. When user uses profile 1 to connect with contact X, user's details, like, username, nickname, photo, attached to this specific profile, (but not his number), will be visual to contact X, who will recognize user through his username. If user chooses to show his number or code-number, he will have to change the default setting of his profile. The codes are changeable, but username attached to profile, is not. A vocal phone communication via application, either incoming or outgoing, shall leave no trace on the phone log and no trace of using the application.

Once user enters the application, he is able to see his messages and identify caller. Furthermore, caller is able to withdraw or erase his sent message or media, as long as user is off line and did not accept the said message or call. Once user gets on line, withdrawal or erasing is impossible and the information sent is visual to receiving user.

At the bottom of the screen is a "panic" switch. Pressing it closes the application immediately and user is switched over to a predefined website or service (for example another application) which is changeable upon choice by user.

On the contact information screen there is a "punish" switch. Activating this option on a contact turns the contact into "mute" state. Meaning that user is able to send the punished contact electronic messages or media, but the punished contact is unable to respond. He can only observe the chat, for example. This option is time-manageable, from 1 minute to 96 hours. Once the predefined time expires, punished contact is able to communicate again with user or group chat. User is able to release contact from his "punished" state anytime.

Adding a new contact to user's contact list is performed in either of the two manners, (providing that contact has installed the application on his phone): (1) user approaches contact by contact's username, requesting permission to be part of contact's contact-list. (2) User approaches contact by using contact's phone number to send a message requesting permission to be part of contact's contact-list—the invited contact will not see user's phone number just his nick name and a link to download the application or become a friend with sender. Either way, once approved, user's username is added to contact's contact-list and contact's username is added to user's contact-list.

User is able to block vocal communication with a contact, but leave electronic messages & media communication. The choice of communication way is changeable by user anytime.

The dialer that opens the virtual world is external, meaning that it is not located on the phone. In order to apply the service the user has to install the application on his apparatus and register to the service by choosing a nickname and a code. User may create endless different identities, each bearing a different access code from same apparatus. User is able to access the application from any other apparatus (computer, tablet etc.), regardless of its geographical location, provided that it is connected to the internet.

If and when, user decides to erase one or all identities, he may do so easily and thus erasing all history of the identity, including media, pictures, vocal files, e-mail etc., without a trace.

DETAILED DESCRIPTION OF THE PREFERRED EMBODIMENTS

Figure 1:
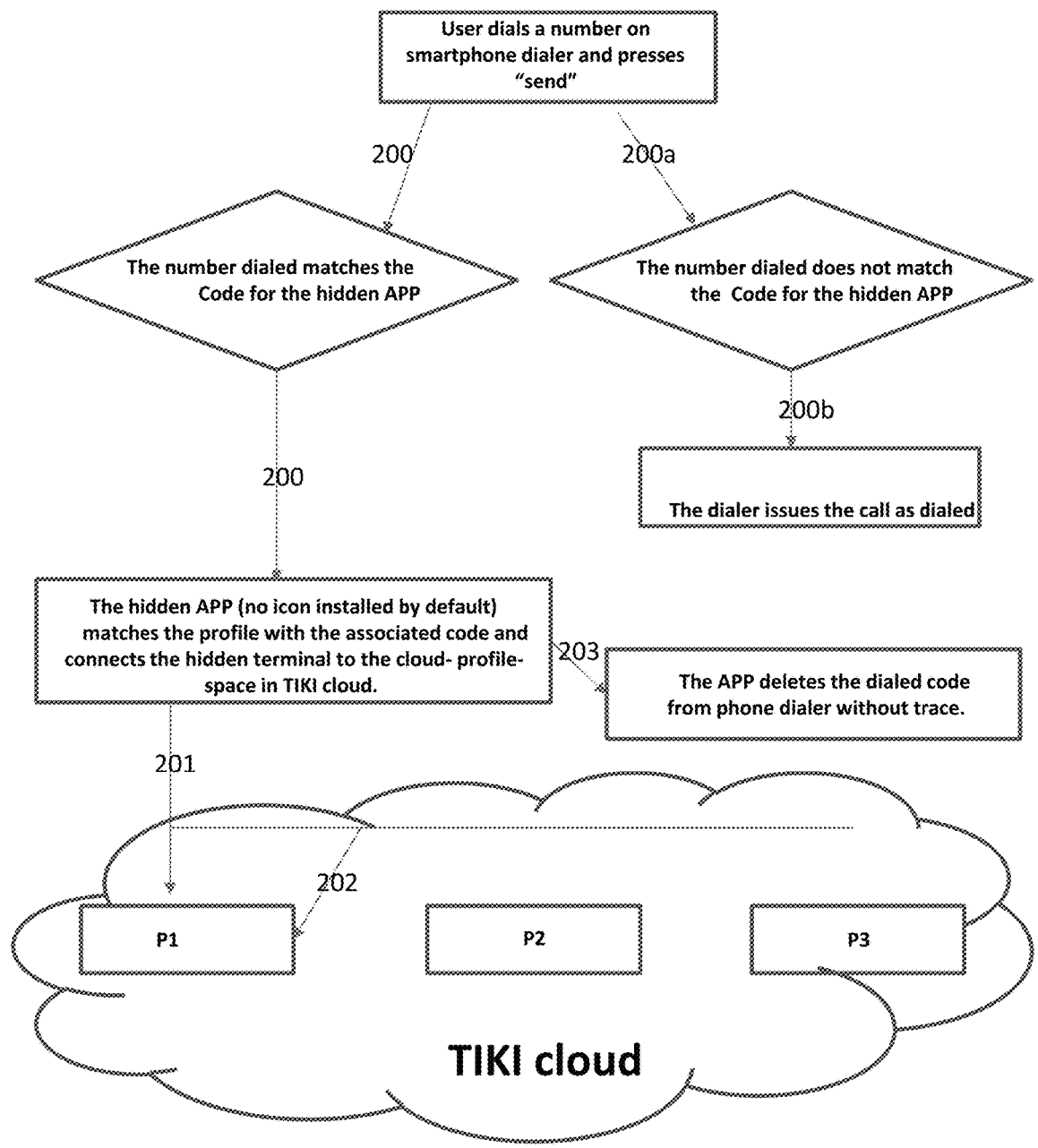
FIG. 1 general chart flow of MDI (hidden code) communication.
Figure 2:
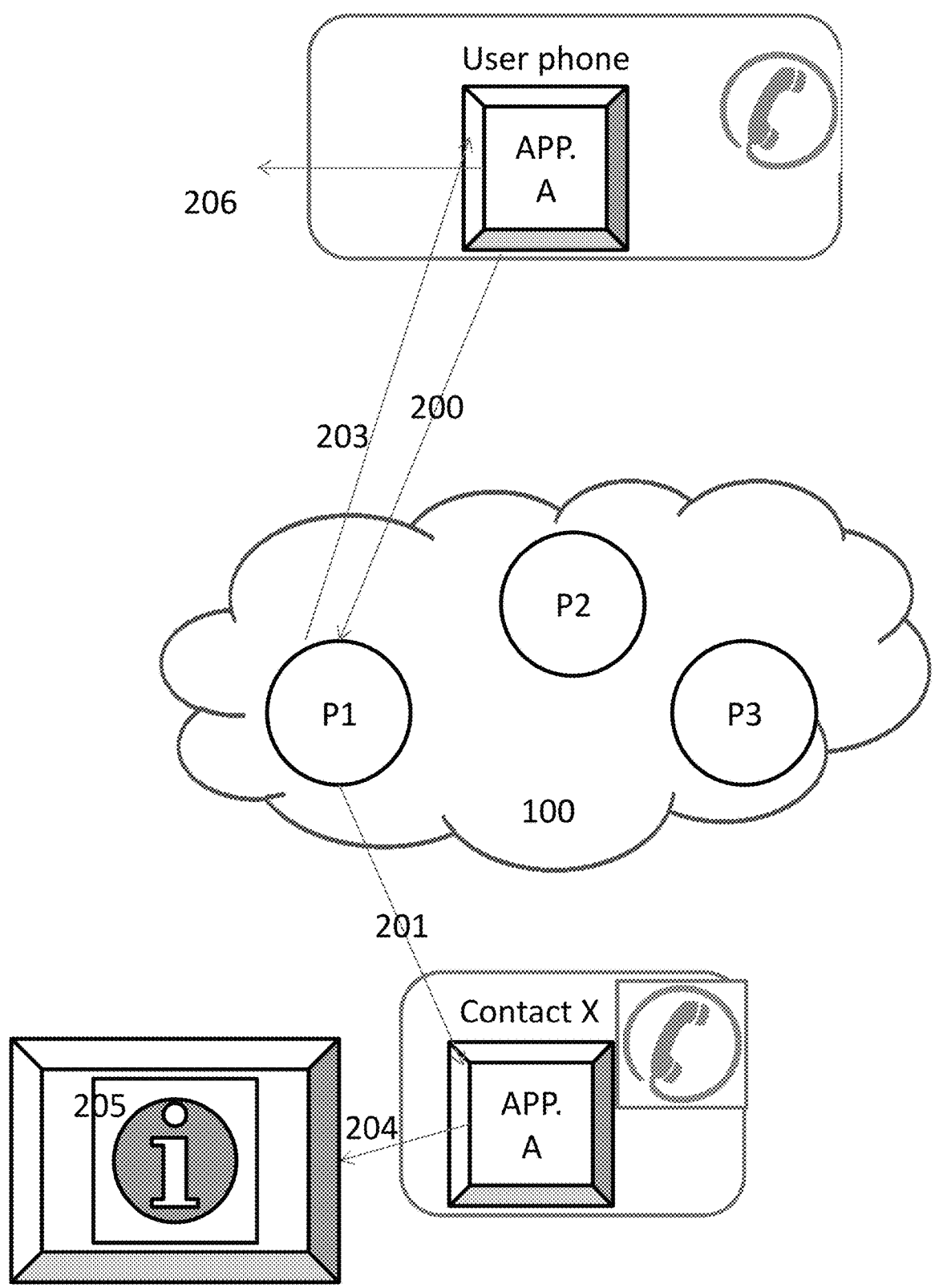
FIG. 2 chart flow of MDI communication to contact X. When user makes an MDI communication [200] from APP. A, on phone home page, it goes through cloud-server with a certain code, which matches Profile 1[P1]. The communication of [P1] [201] goes to APP. A, on contact X's phone. APP.A on Contact X's phone opens [204] user's details [205]. All details concerning that call are erased [203] from APP.A.
Figure 3:
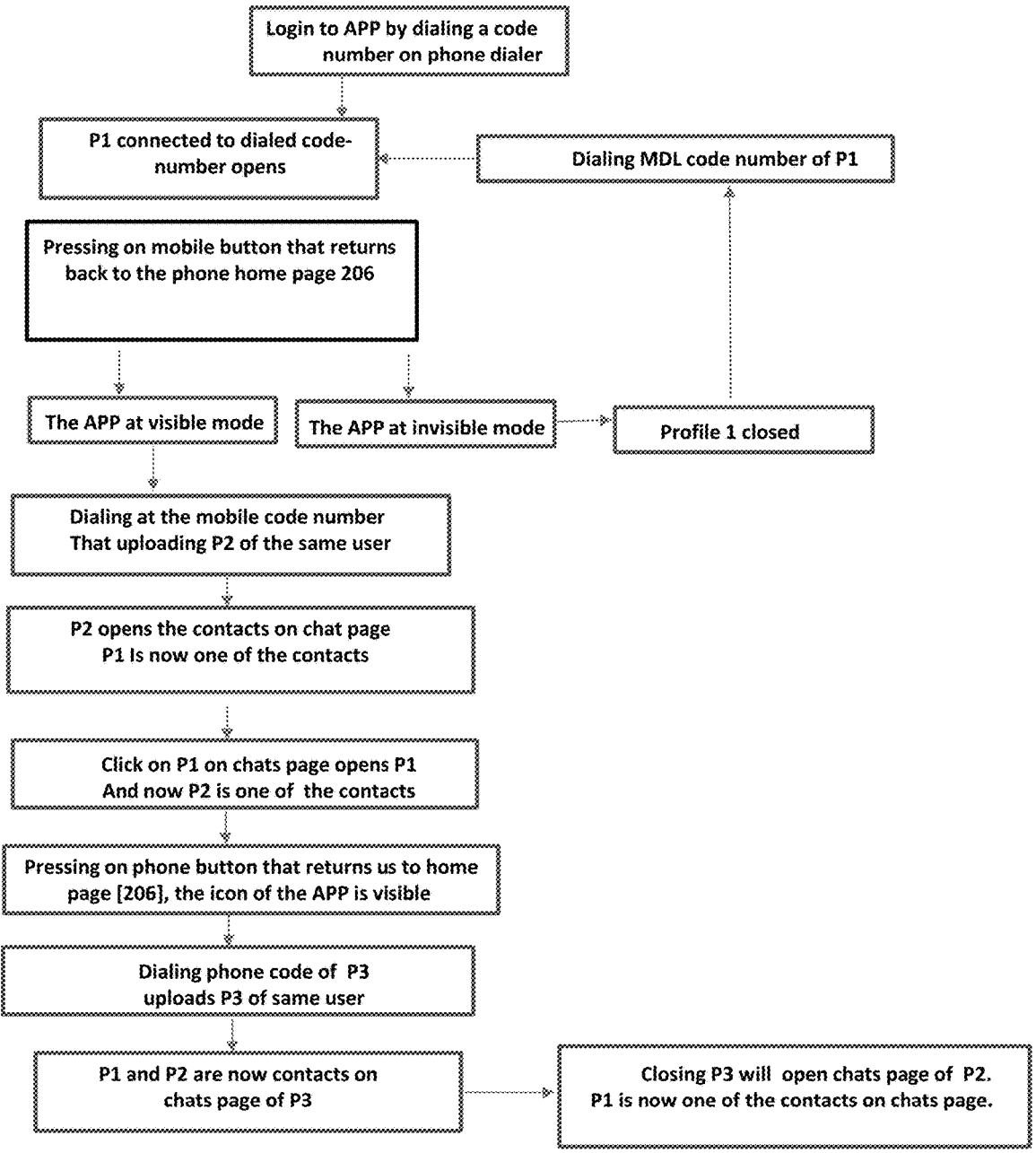
FIG. 3 chart flow showing opening of more than 1 profile of same user at the same time.
Figure 4:
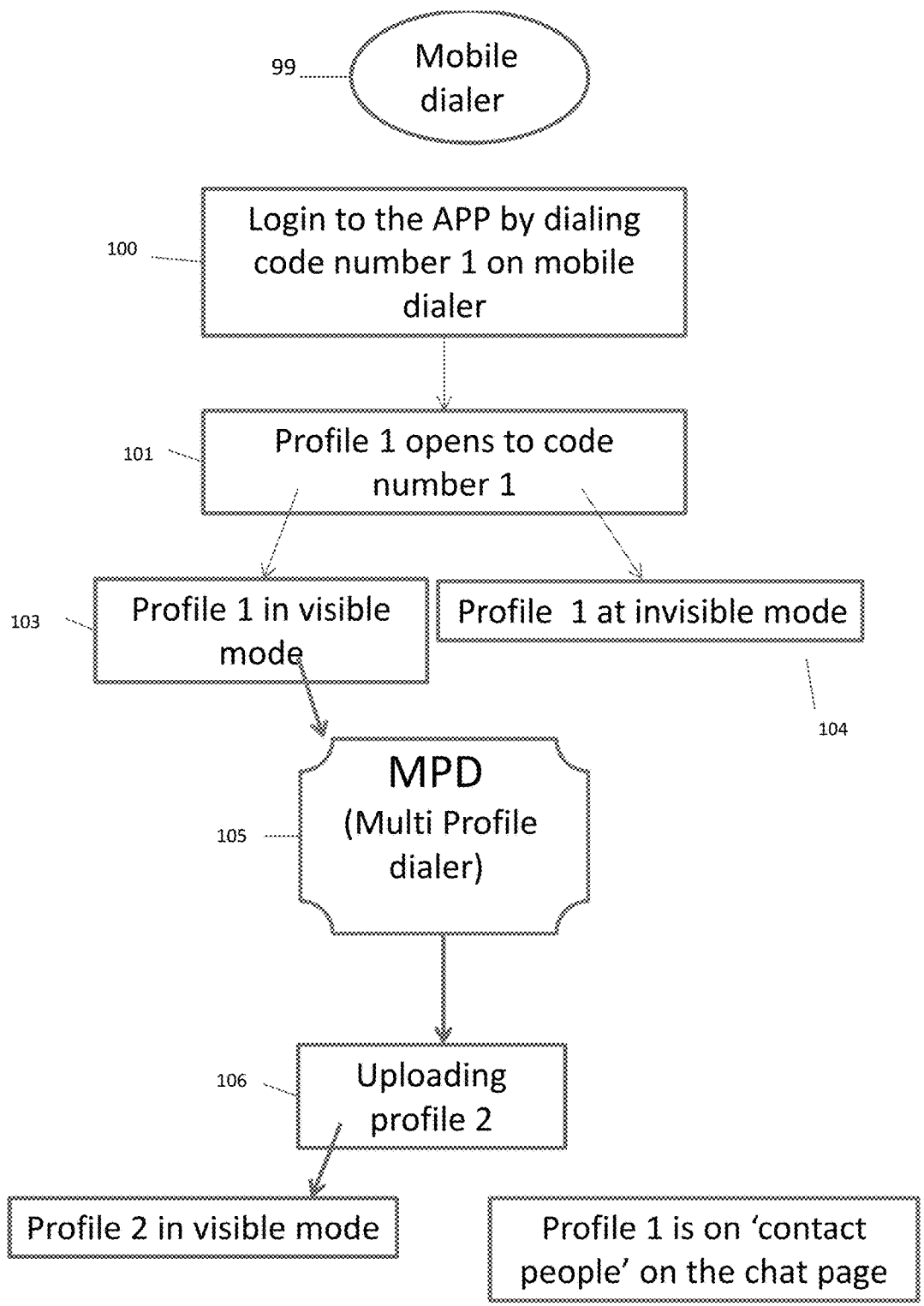
FIG. 4 step 1—login to APP by dialing a code on the mobile dialer.
Figure 5:
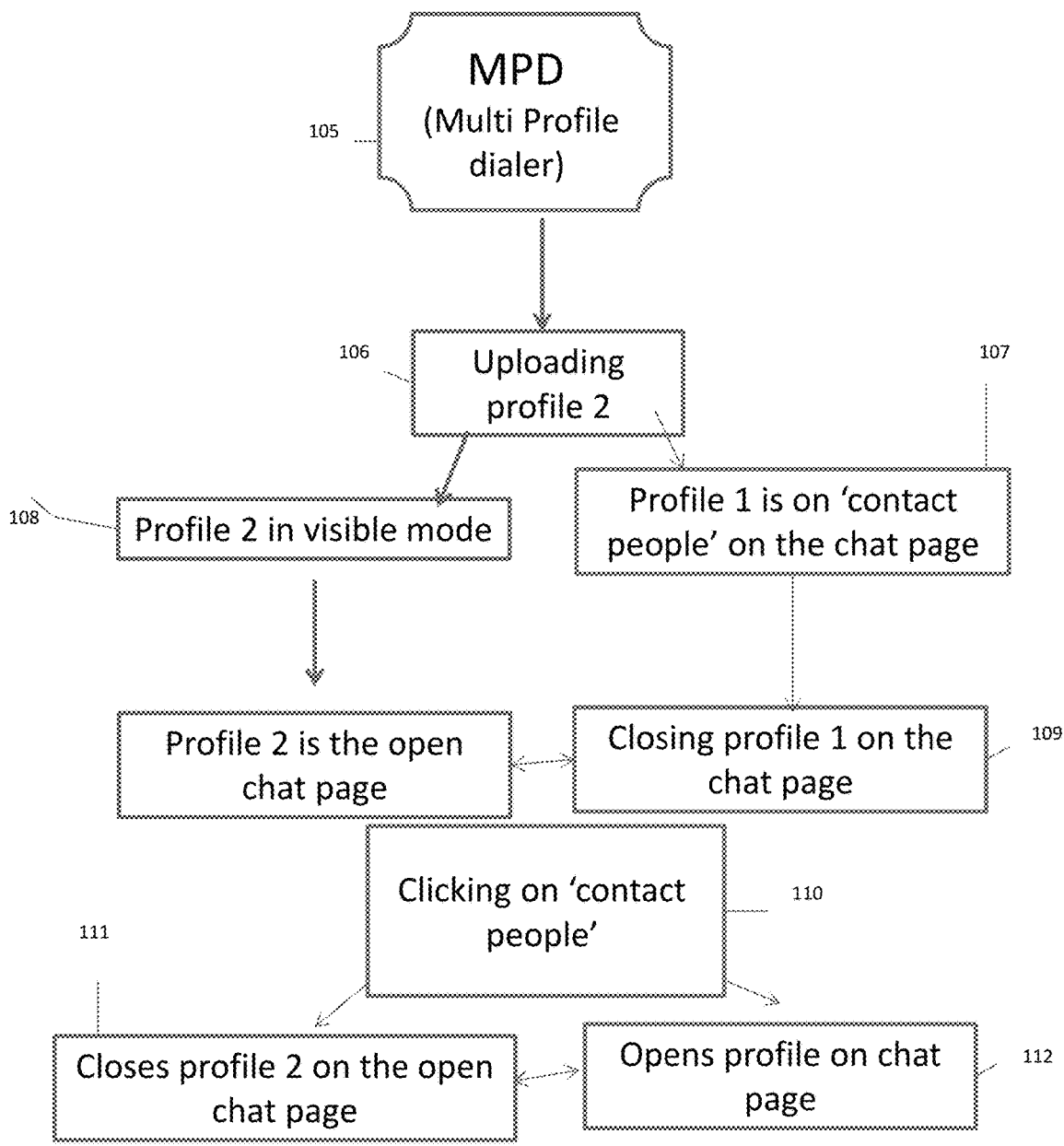
FIG. 5 step 2—Functioning of MPD button, uploading another profile.
Figure 6:
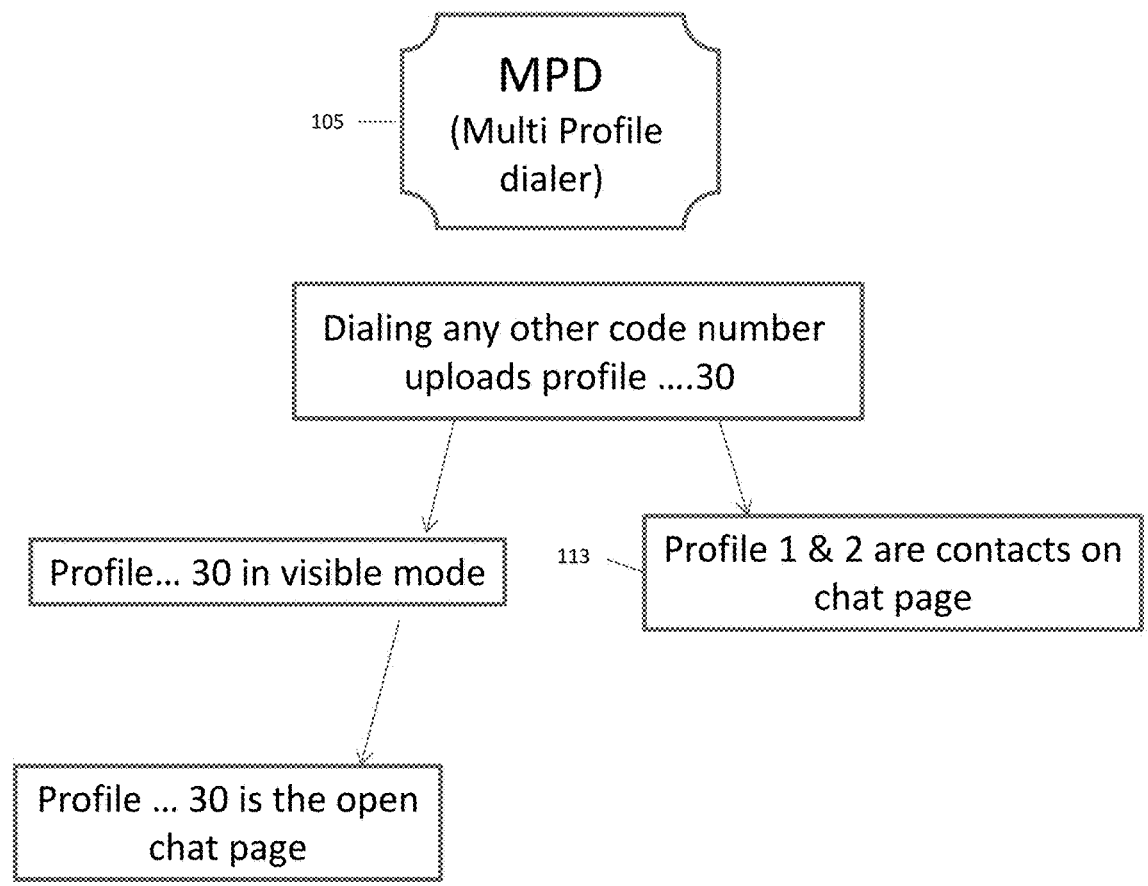
FIG. 6 step 3—using the multi profiles button (MPD) to upload further profiles.
Figure 7:
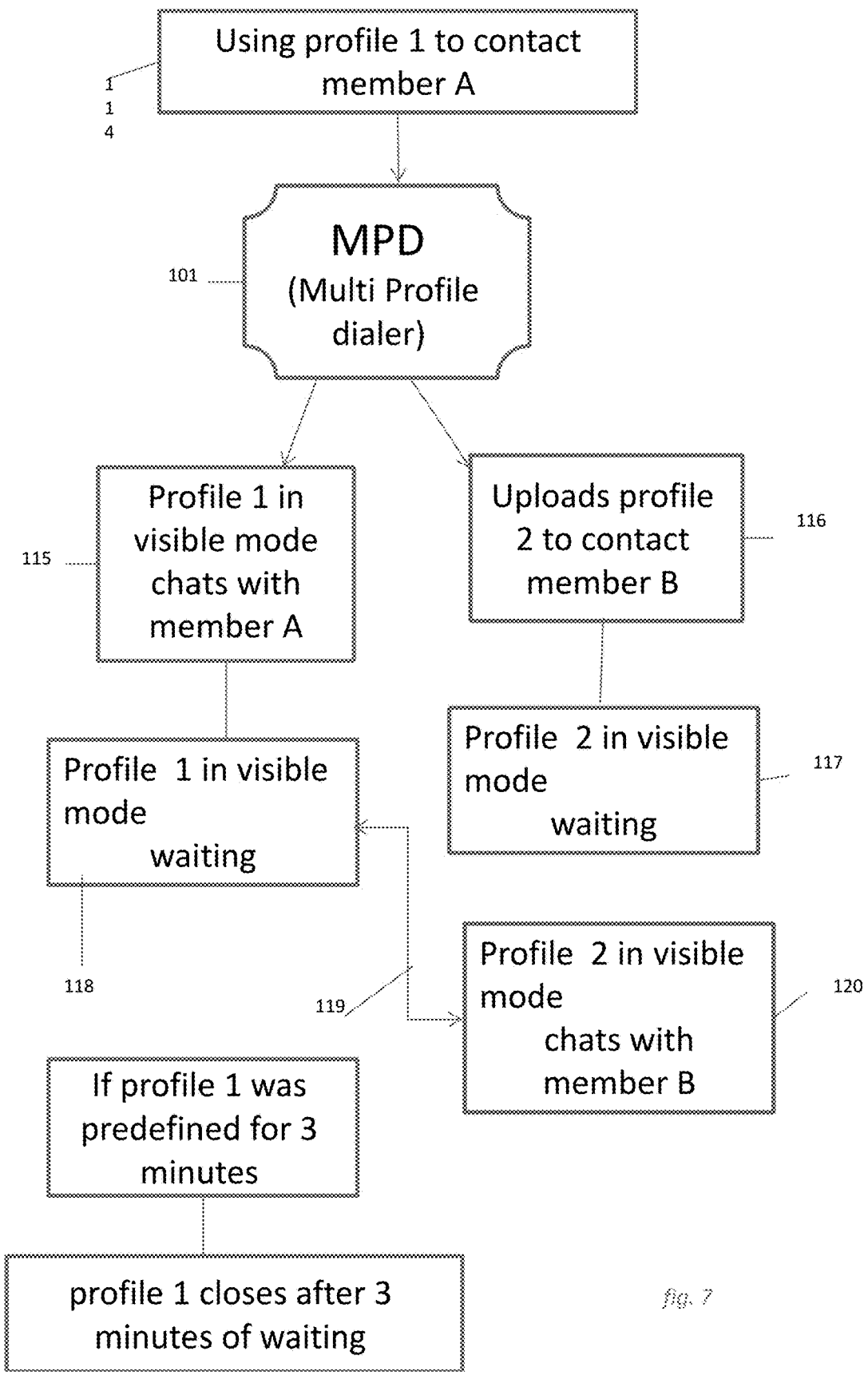
FIG. 7—shows transfers between profiles with MPB
Figure 8:
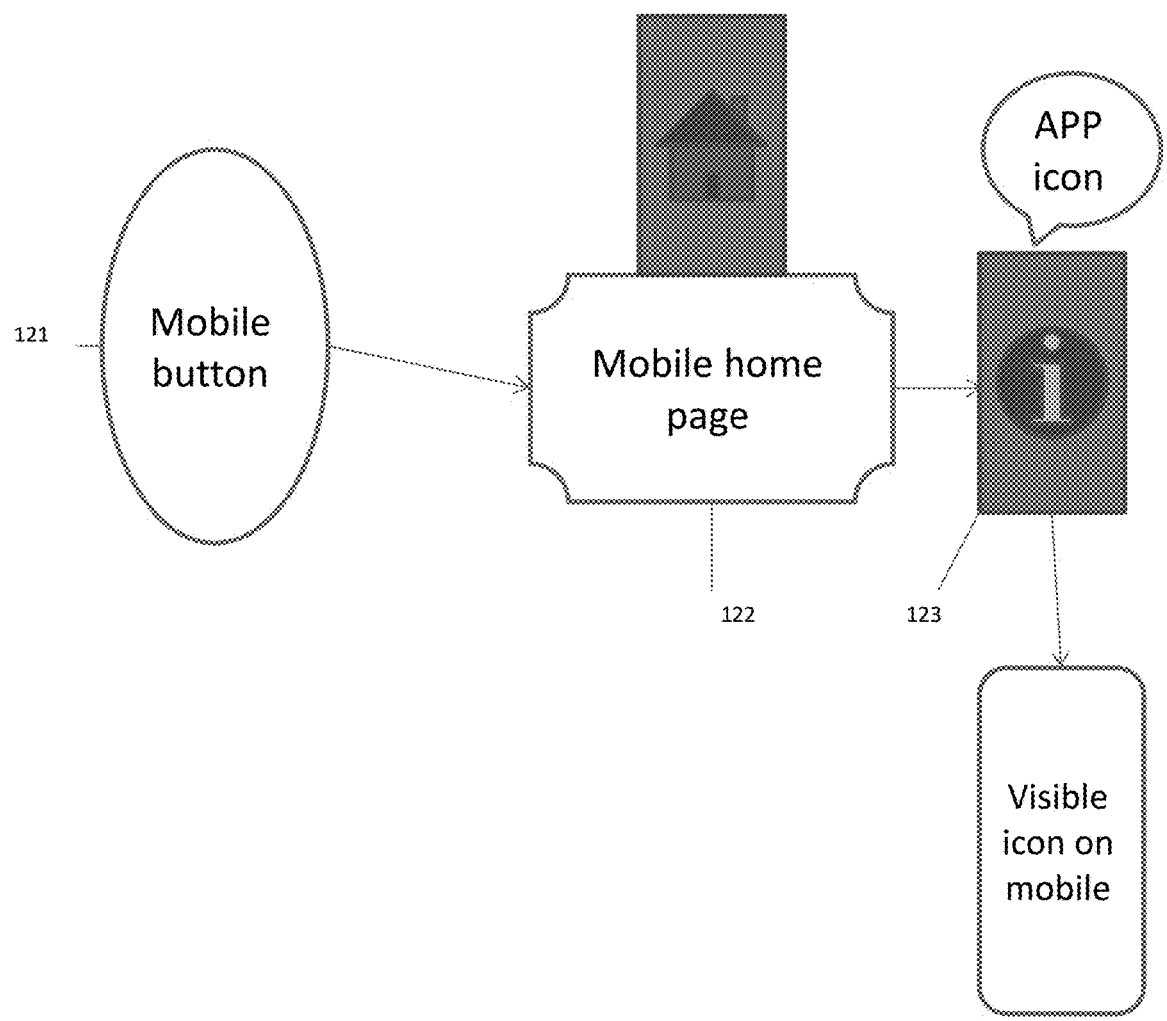
FIG. 8 step 4 closing of the system and returning to home page.

One of the embodiments of the present invention discloses a system with which user may perform either vocal phone communication, or send all kind of electronic media under different profiles (identities) simultaneously [202]. Each profile [P] has its own code; all profiles are on cloud-server [100]. When user likes to connect with contact X via profile 1[P1], contact X has to have the application installed on his phone and be accepted by user as a registered member. When user uses profile 1[P1] to connect with contact X, user's details [205], (like, username, nickname, photo, attached to this specific profile, (but not his number), will be visual to contact X, who will recognize user through his username.

MPD button is used to upload profiles and MPB button is used to switch between profiles, All id performed on cloud server.

The connections between user via any of his profiles are performed on cloud server and leaves no trace on his phone log. Since all traffic of communication & media are not performed on the phone, there is no way to follow said communication, unless the follower knows the code to revive the APP. And the right code to a specific profile.

When first installing the application, the user registers his mobile phone number and creates an account on terminal with this number. He then builds one or several identities (profiles), which are connected to the original mobile number and assigns a different code to each profile. By typing the profile code on the mobile dialer (100), he opens a web view with the desired profile. There must be a match between phone number and profile code.

Each profile has its own code; all profiles are on cloud-server. When user likes to connect with contact X via profile 1, contact X has to have the application installed on his mobile and be accepted by user as a registered member.

When uploading profile 1 to which the code applies (101). There are two possibilities: 1—profile 1 is visible (103); 2—profile 1 is invisible (103)

User may upload many profiles from his cloud account by using the multi profiles dialer (MPD) (105), and switch from one profile to the other with MPB, while other profiles remain in his 'contact people'. Both, MPD & MPB operate from invisible and visible alike. It will redirect the function used to the next profile and close the invisible one.

Dialer (99) comprises of the any combination: numbers, shapes, colors, letters, pictures etc.

When profile 2 is uploaded and visible (106), profile 1 retreats to 'contact people' mode on profile 2 (107). The open profile on the chat page is profile 2. Further other profiles up to 30 may be uploaded by using MPD. The other profiles (for example 1 & 2) retreat to 'contact people' mode on the open profile chat page.

When profile 2 is the open chat page (108), profile 1 is closed on the chat page (109).

Clicking on "contact people" (110) closes profile 2 on the open chat page (111) and opens another profile, (for example 'profile 1'), on chat page (112). The Profile will be added on chat list as a row in a different color so that there will be visual differences between profile and chat.

This way, up to 30 profiles may be uploaded and by clicking on MPD the user is able to switch between them, while the other profiles are contacts on chat page (113).

When pressing on the mobile button (121) to return to mobile home page (122), the icon of the application is visible (113). Pressing on the icon (123) opens one of the visible profiles. If there is no visible profile, there is no icon on mobile home page. If there is no home button on that mobile, the user may use the 'close app' back button and disconnect from application.

A further embodiment of the present invention discloses a state where user chats with more than one member on line. For example, if user has 2 profiles 1 where A is a member and profile 2 where B is a member. It does not matter what are the statuses of user's profiles, (visible or non-visible or which profile is in the front), it is a situation where both profiles are open, once using MPD button (105). In profile 1 user chats with member A (114) and in profile 2 user chats with member B (116). It does not matter which profile is open in front or which in chat page (117 & 118). What matters is that both member A and B can see that user is on line and user may switch between them (119).

If user predefined profile 1 to a status of visibility for only 3 minute and he chats in profile 2 for over 3 minutes, profile 1, which is on his chat list in profile 2, will close automatically when 3 minutes have elapsed.

The invention claimed is:

1. A virtual operating system for operating a terminal secure privacy application to a cloud based service for an apparatus capable of internet interception operating in a hidden background, comprising:
    an activation code comprising a cryptic code for opening a terminal on the apparatus without leaving digital traces on the apparatus;

a security authentication device shared only between users in a cloud server environment, the security authentication device connecting the terminal to cloud a profile in the cloud server environment erasing dialed cryptic code from a smart device log; and a cloud server, wherein the cloud server comprises: a multi profiles dialer button (MPD) and lists of users' profiles, each reachable by a different password or code, each comprising an independent: function menu, contact list, function, punish function, multi profiles button (MPB), and apparatus log;

wherein each profile has a punish switch that when activated, enables a user to controls a contact application by putting a contact in a mute position for a predetermined period, during which the user is unable to send to other users or to chat group electronic messages or media, but is able to receive data.

2. The system of claim 1 wherein the apparatus dialer comprises any combination of:

numbers, shapes, colors, letters, and pictures.

3. The system of claim 1 wherein the activation code activates a cryptic code opening a hidden terminal from an apparatus with internet interception without appearing on the apparatus screen.

4. The system of claim 3 wherein the hidden terminal connects to a cloud profile space in the cloud server, where the user may manage multiple different and independent profiles, each with a separate operating system or application.

5. The system of claim 3 wherein, when the user leaves the hidden terminal, dialed cryptic code is forever erased from a smart device log.

6. The system of claim 1 wherein the user has a VOIP phone with a unique number provided by the system for each different user's profile.

7. The system of claim 1 wherein the user installs various applications including applications provided by third parties either directly or through an iAvatars app store.

8. The system of claim 1 wherein the user creates separate and independent profiles and each profile has its own code, function menu and contact list, and the user may switch between them simultaneously by the use of MPB button.

9. The system of claim 1 wherein each profile has a panic function that closes the service immediately and the user is switched over to a predefined website or service and all traces of use of the profile, a dialer or a terminal are erased.

10. The system of claim 9 wherein the dialer opening a virtual world is external and enables the user to choose different phone numbers compatible to any geographical prefix.

11. The system of claim 9 wherein applying the service depends on installation of the application on an apparatus with internet access and registration to the service.

* * * * *